(12) United States Patent
Yasukawa

(10) Patent No.: US 11,212,190 B2
(45) Date of Patent: Dec. 28, 2021

(54) COMMUNICATION APPARATUS AND CONTROL METHOD FOR THE SAME

(71) Applicant: CANON KABUSHIKI KAISHA, Tokyo (JP)

(72) Inventor: Akari Yasukawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/765,696

(22) PCT Filed: Sep. 27, 2016

(86) PCT No.: PCT/JP2016/004351
§ 371 (c)(1),
(2) Date: Apr. 3, 2018

(87) PCT Pub. No.: WO2017/061081
PCT Pub. Date: Apr. 13, 2017

(65) Prior Publication Data
US 2019/0089600 A1 Mar. 21, 2019

(30) Foreign Application Priority Data
Oct. 9, 2015 (JP) .............................. JP2015-201388

(51) Int. Cl.
*H04L 12/24* (2006.01)
*G06F 13/00* (2006.01)
*H04W 84/10* (2009.01)
*H04L 12/28* (2006.01)
*H04W 88/02* (2009.01)
(Continued)

(52) U.S. Cl.
CPC .............. *H04L 41/22* (2013.01); *G06F 13/00* (2013.01); *H04L 12/28* (2013.01); *H04L 12/6418* (2013.01); *H04L 41/12* (2013.01); *H04W 4/33* (2018.02); *H04W 4/80* (2018.02);
(Continued)

(58) Field of Classification Search
CPC ......... H04L 41/22; H04L 41/12; H04L 12/28; H04L 12/6418; H04W 4/33; H04W 4/80; H04W 8/005; H04W 84/10; H04W 84/18; H04W 88/02; G06F 13/00
See application file for complete search history.

(56) References Cited

U.S. PATENT DOCUMENTS 7,577,115 B2 * 8/2009 Jang ................... H04B 1/70735
370/320
9,258,195 B1 * 2/2016 Pendleton ............... H04L 41/12
(Continued)

FOREIGN PATENT DOCUMENTS

JP 2004-326607 A 11/2004
JP 2007-067723 A 3/2007
JP 2013-153533 A 8/2013

*Primary Examiner* — Jeffrey M Rutkowski
*Assistant Examiner* — Jasper Kwoh
(74) *Attorney, Agent, or Firm* — Canon U.S.A., Inc. I.P. Division

(57) ABSTRACT

Provided is a system with which devices participating in a particular network and devices that are not participating in the particular network can be easily distinguished from one another. A communication apparatus displays a list screen of devices existing in the surroundings of the communication apparatus. This list screen is displayed while identification information indicating whether or not the device is participating in the particular network is associated with the device.

12 Claims, 12 Drawing Sheets

(51) Int. Cl.
  *H04W 4/33*   (2018.01)
  *H04L 12/64*  (2006.01)
  *H04W 4/80*   (2018.01)
  *H04W 8/00*   (2009.01)
  *H04W 84/18*  (2009.01)

(52) U.S. Cl.
  CPC ........... *H04W 8/005* (2013.01); *H04W 84/10* (2013.01); *H04W 88/02* (2013.01); *H04W 84/18* (2013.01)

(56) References Cited

U.S. PATENT DOCUMENTS

| | | | | |
|---|---|---|---|---|
| 2007/0283152 | A1* | 12/2007 | Kudo | H04L 63/0428 713/168 |
| 2012/0257561 | A1* | 10/2012 | Redding | H04L 12/1827 370/312 |
| 2013/0163043 | A1* | 6/2013 | Suzuki | G06F 3/1296 358/1.15 |
| 2013/0311912 | A1* | 11/2013 | Aso | G06F 13/00 715/762 |
| 2013/0324042 | A1* | 12/2013 | Shinomiya | H04W 40/24 455/41.1 |
| 2014/0059635 | A1* | 2/2014 | Sirpal | H04N 21/4307 725/131 |
| 2014/0090003 | A1* | 3/2014 | Eguchi | H04L 65/4076 725/116 |
| 2014/0157135 | A1* | 6/2014 | Lee | H04W 76/14 715/738 |
| 2014/0362728 | A1* | 12/2014 | Krochmal | H04B 7/26 370/254 |
| 2015/0116511 | A1 | 4/2015 | Seiji | |
| 2015/0146221 | A1* | 5/2015 | Hill | G06F 3/1206 358/1.6 |
| 2015/0244568 | A1* | 8/2015 | Asayag | H04L 41/0879 709/220 |
| 2015/0289308 | A1* | 10/2015 | Kang | H04W 76/14 455/41.2 |
| 2016/0080498 | A1* | 3/2016 | Lu | H04L 67/12 709/224 |
| 2016/0328216 | A1* | 11/2016 | Leonelli | G06F 8/34 |
| 2016/0357524 | A1* | 12/2016 | Maluf | G06F 8/34 |
| 2017/0041070 | A1* | 2/2017 | Ryan | H04B 10/25752 |
| 2017/0055148 | A1* | 2/2017 | Zimmerman | H04W 4/70 |
| 2018/0350170 | A1* | 12/2018 | Wang | G07C 9/27 |

\* cited by examiner

[Fig. 1]
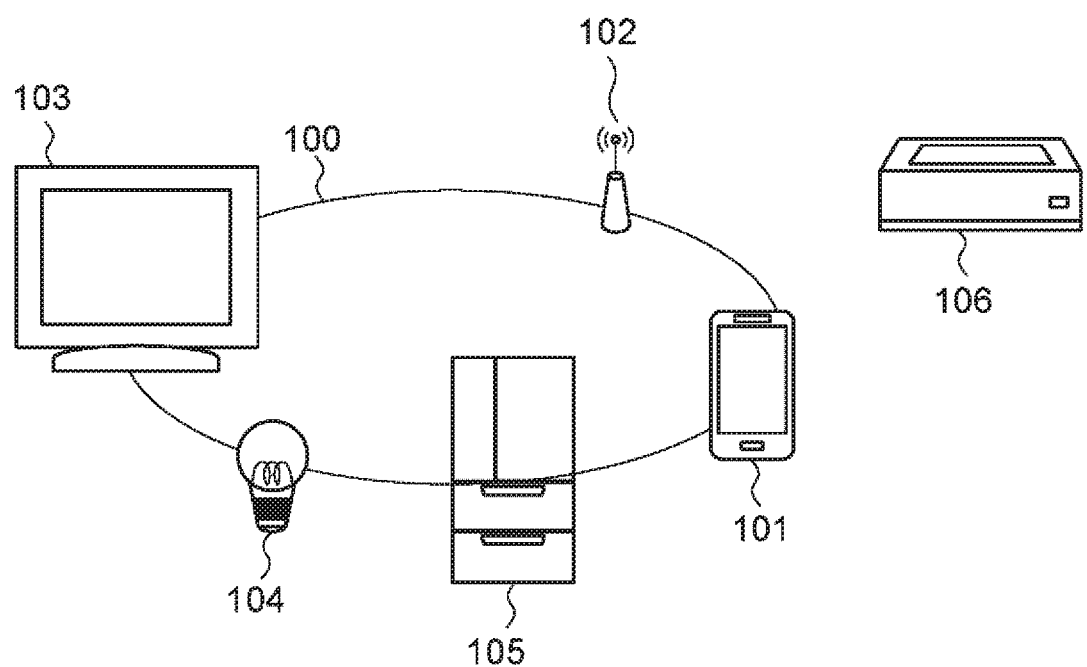

[Fig. 2]
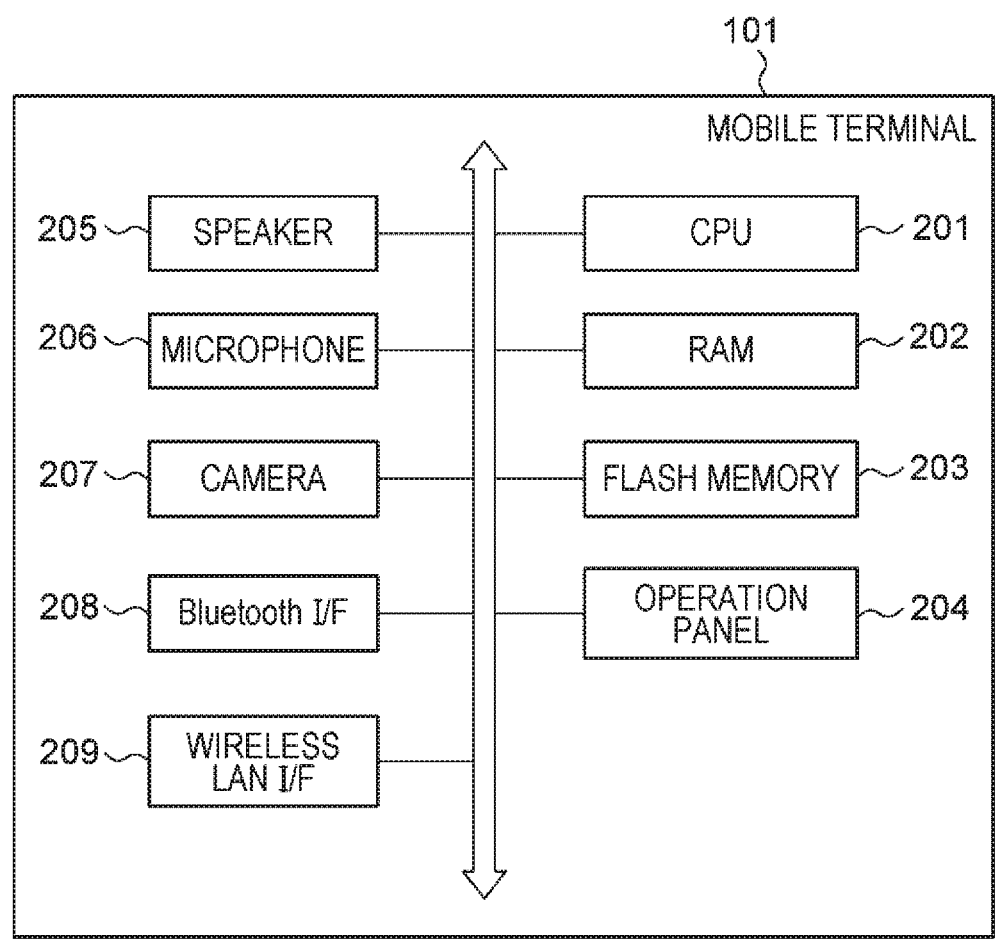

[Fig. 3]
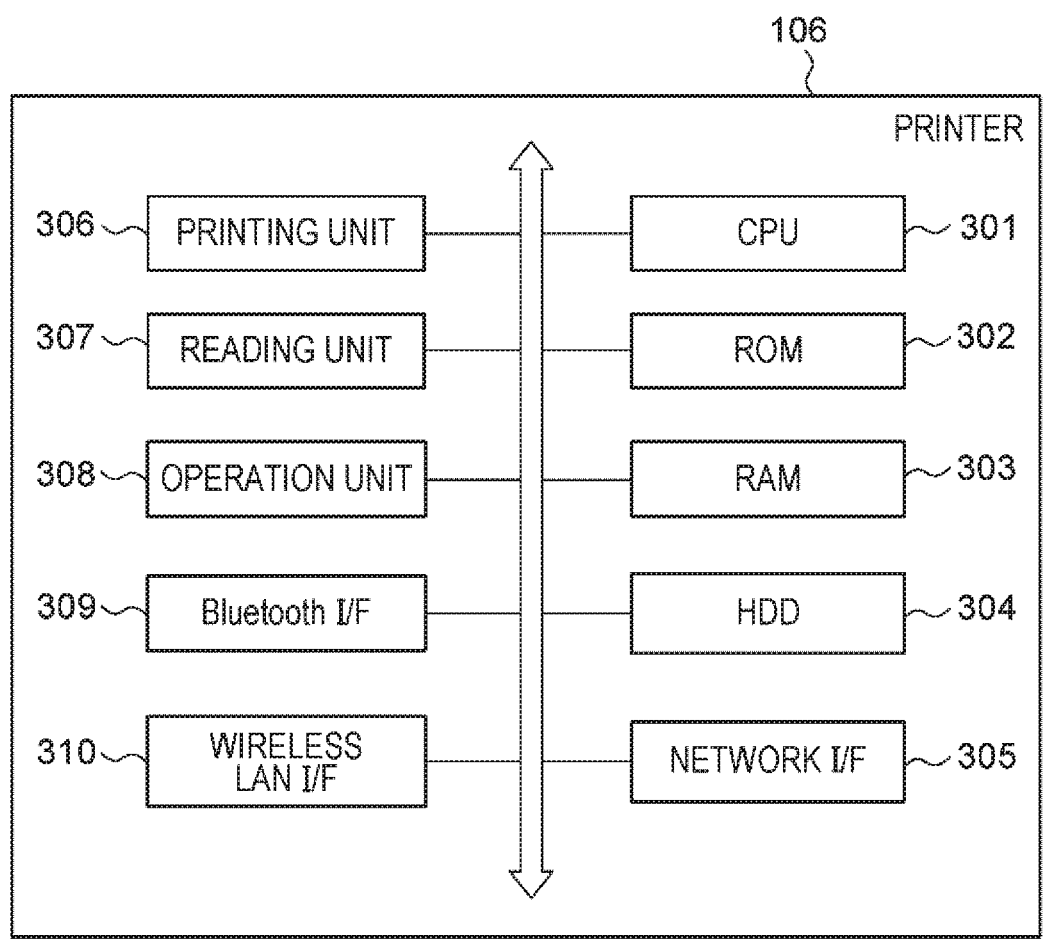

[Fig. 4A]
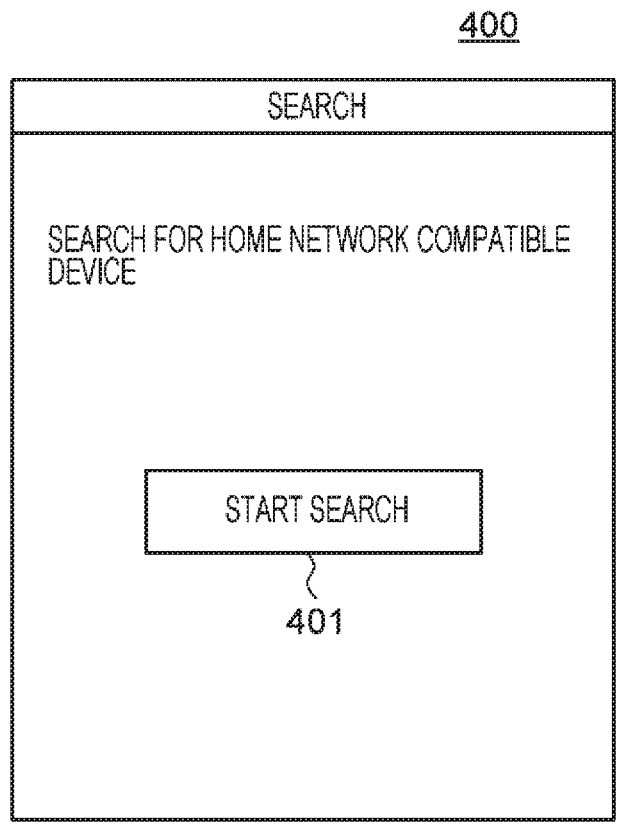
[Fig. 4B]
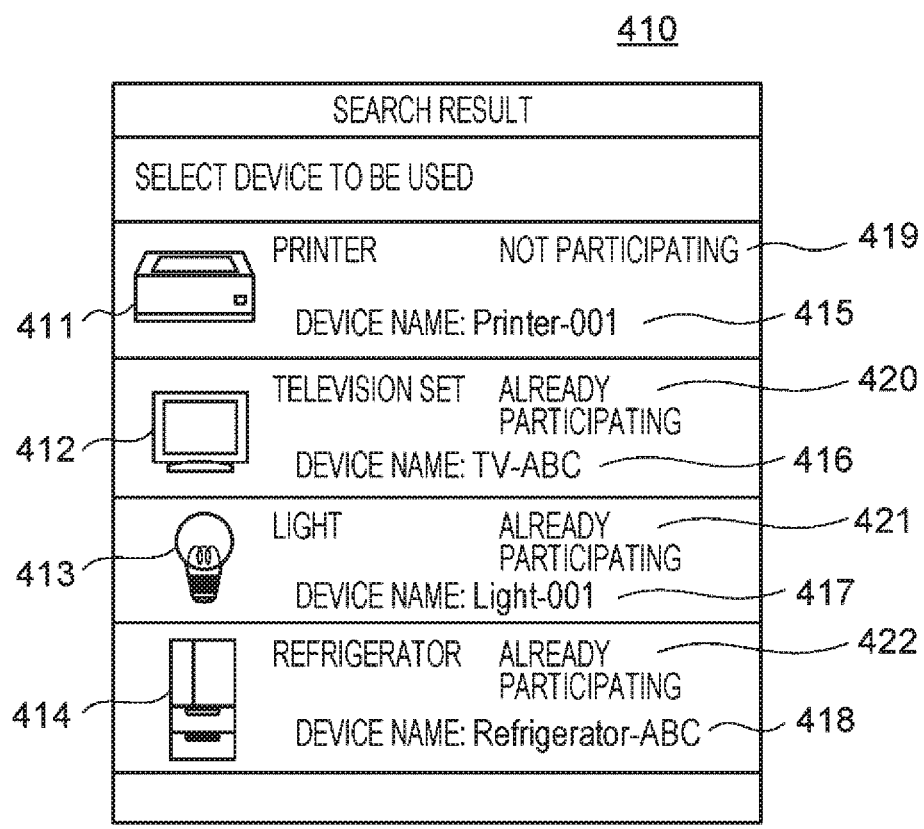

[Fig. 5A]
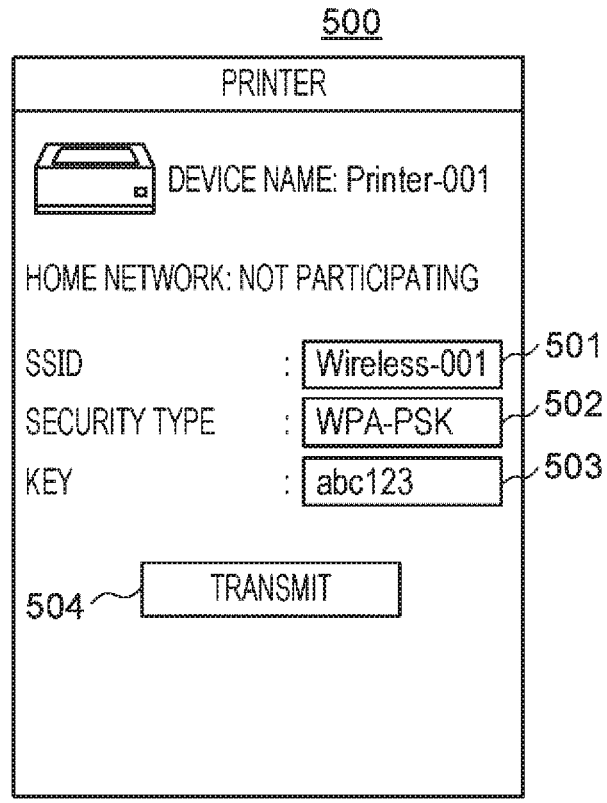
[Fig. 5B]
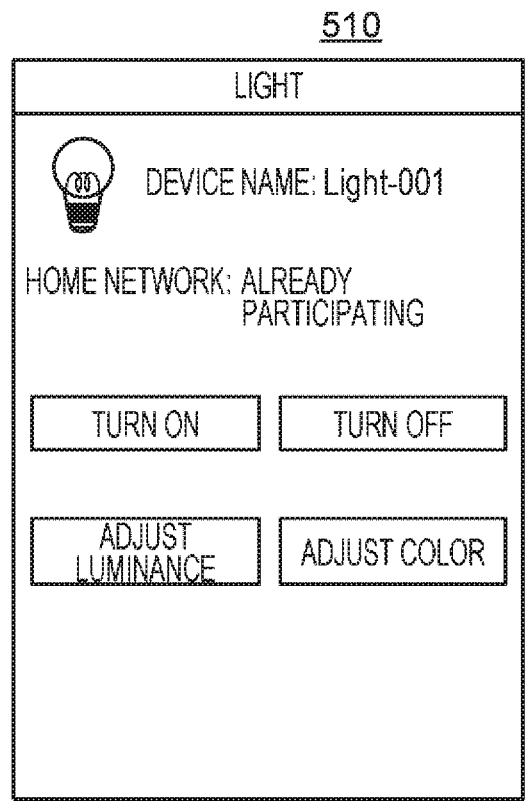

[Fig. 5C]
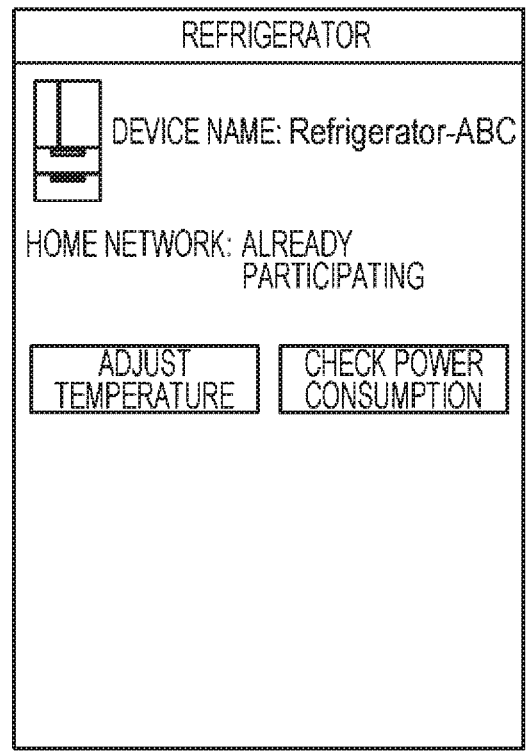
[Fig. 5D]
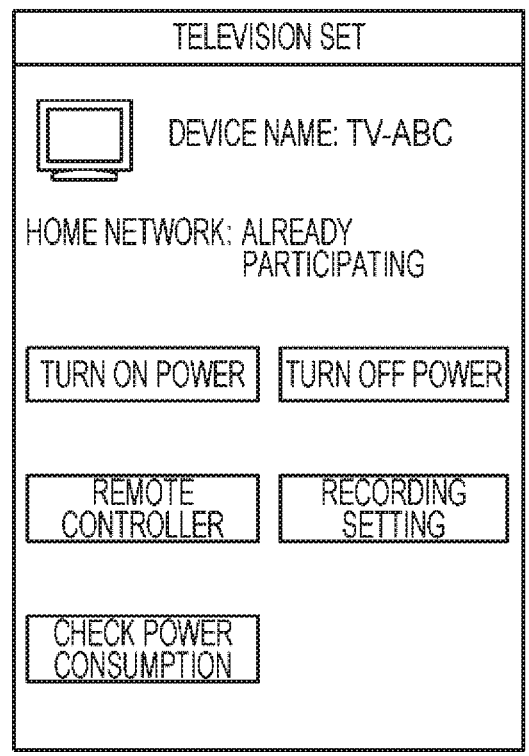

[Fig. 6]
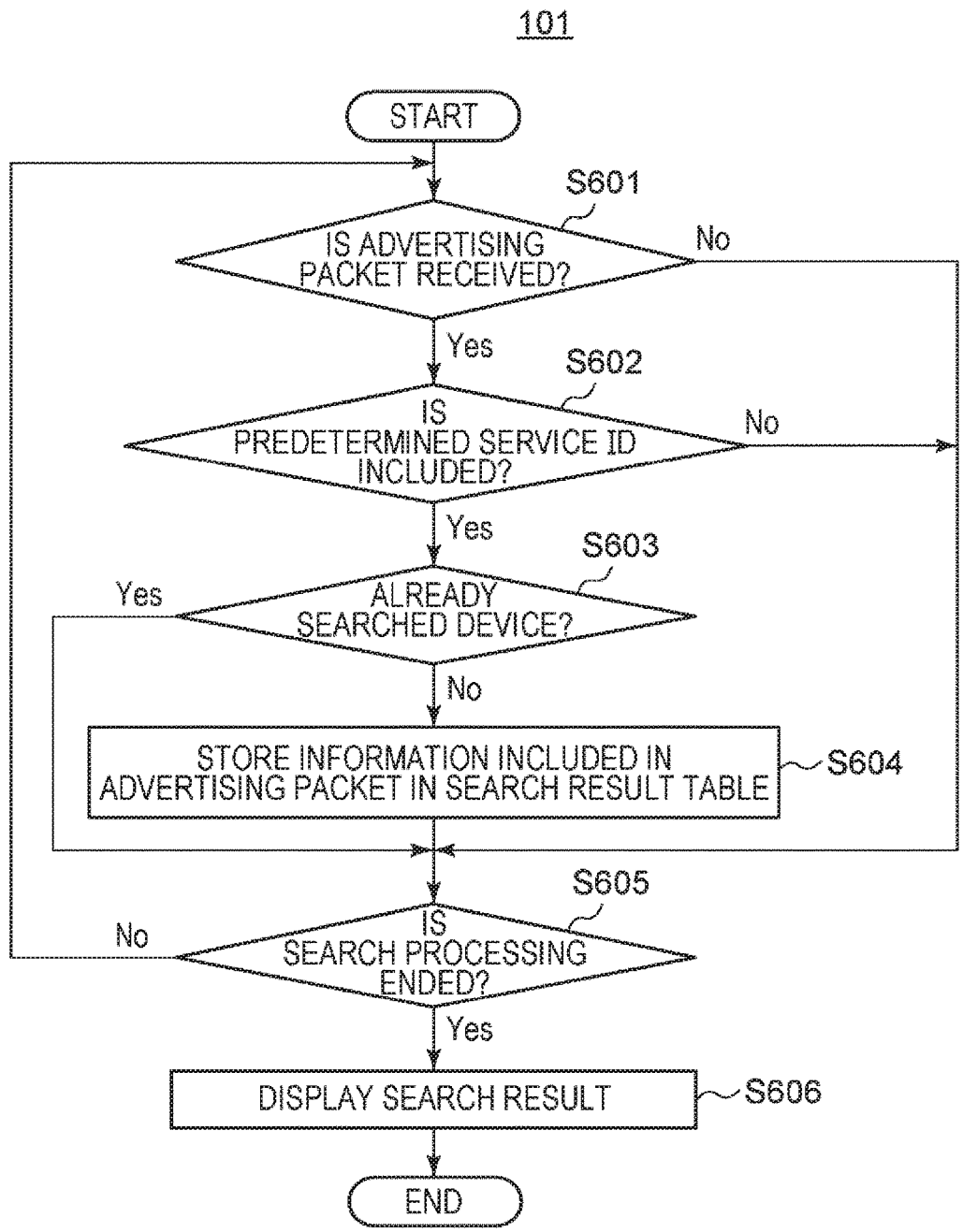

| DEVICE NAME | DEVICE CATEGORY | MAC ADDRESS | HOME NETWORK PARTICIPATING STATUS |
|---|---|---|---|
| Printer-001 | PRINTER | 12:34:56:78:9a:bc | NOT PARTICIPATING |
| TV-ABC | TELEVISION SET | 12:34:56:78:ab:cd | ALREADY PARTICIPATING |
| Light-001 | LIGHT | 12:34:56:7a:bc:de | ALREADY PARTICIPATING |
| Refrigerator-ABC | REFRIGERATOR | 12:34:56:ab:cd:ef | ALREADY PARTICIPATING |

[Fig. 8]
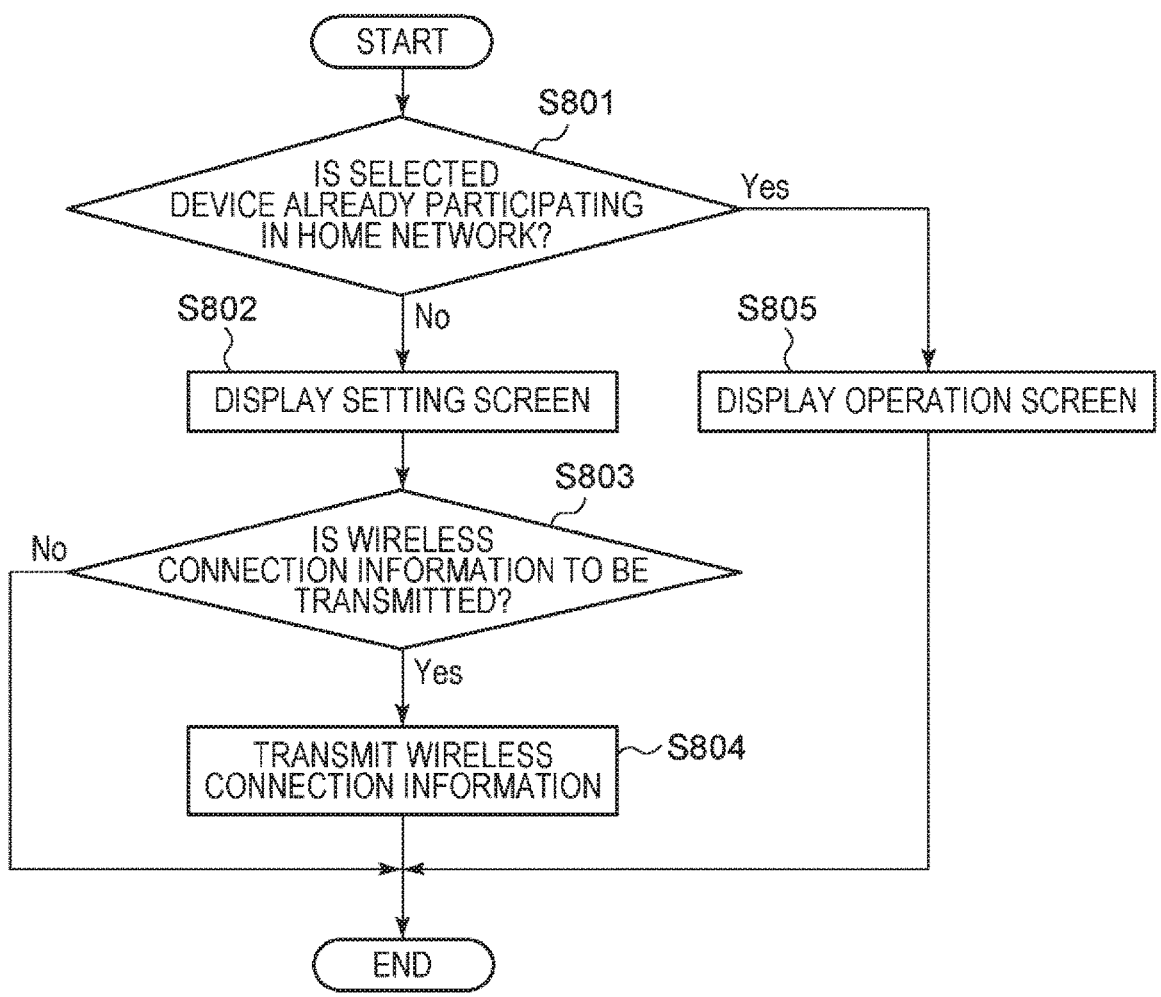

[Fig. 9]
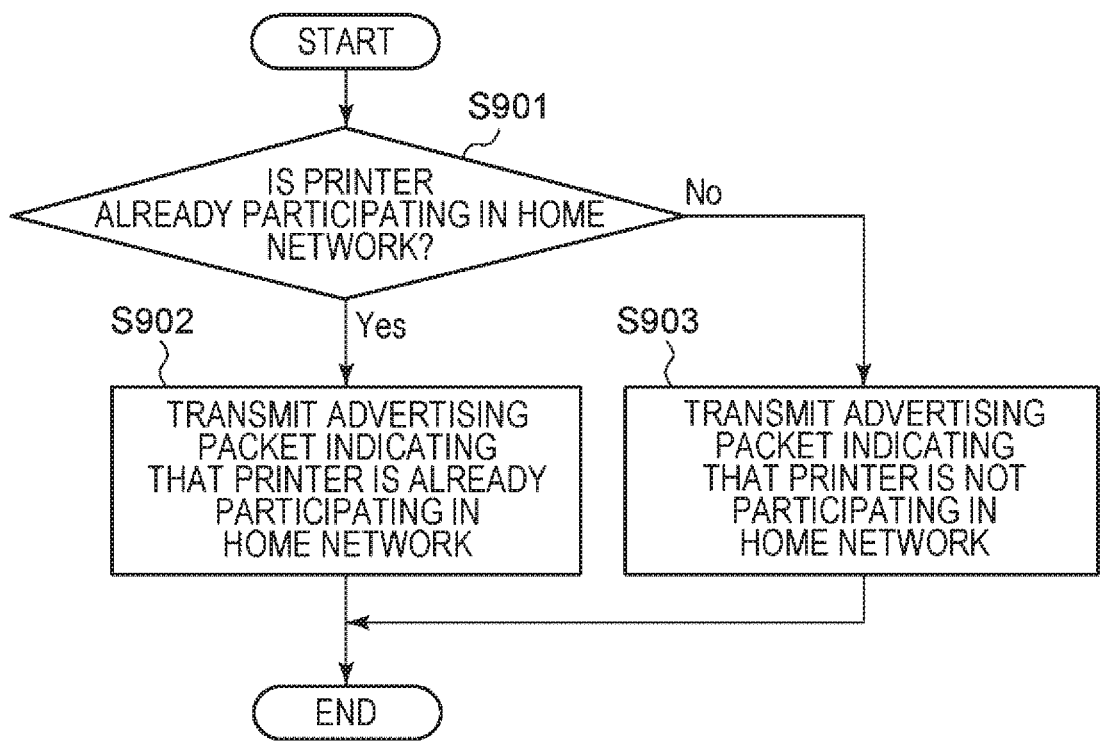

[Fig. 10]
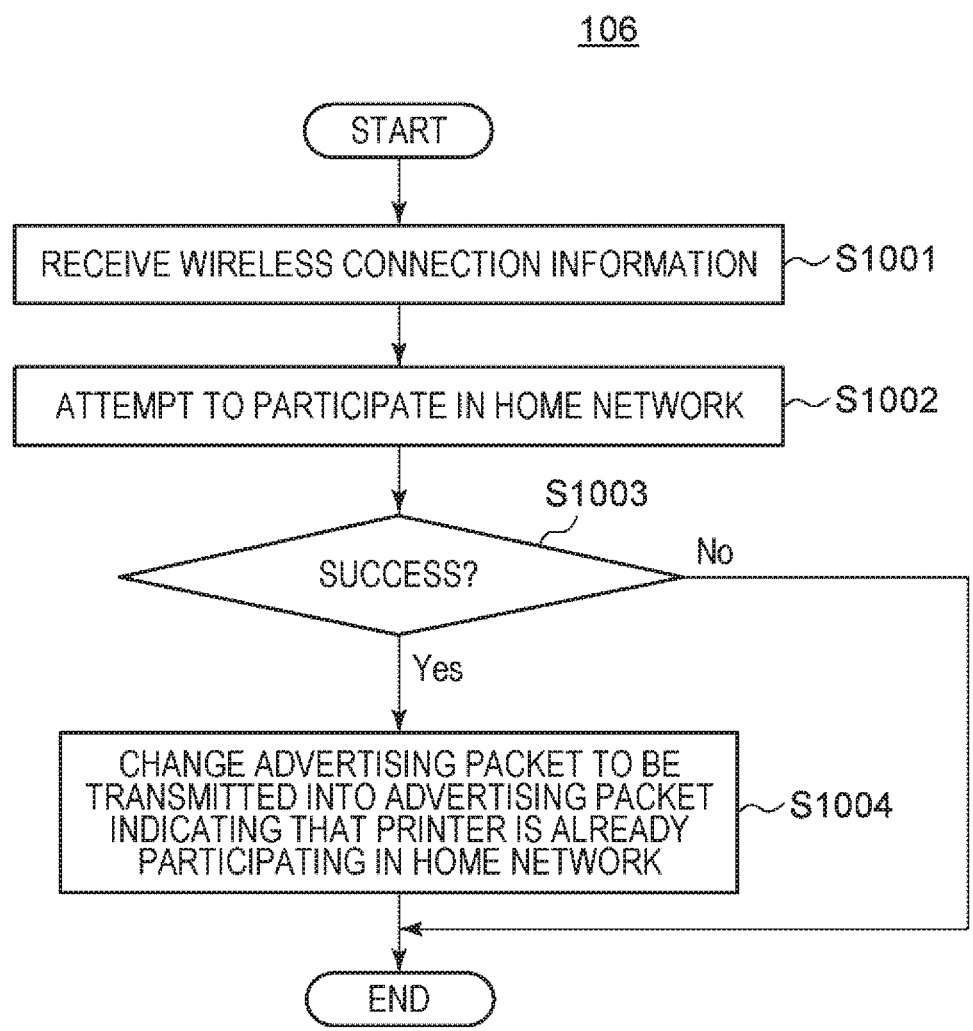

[Fig. 11]
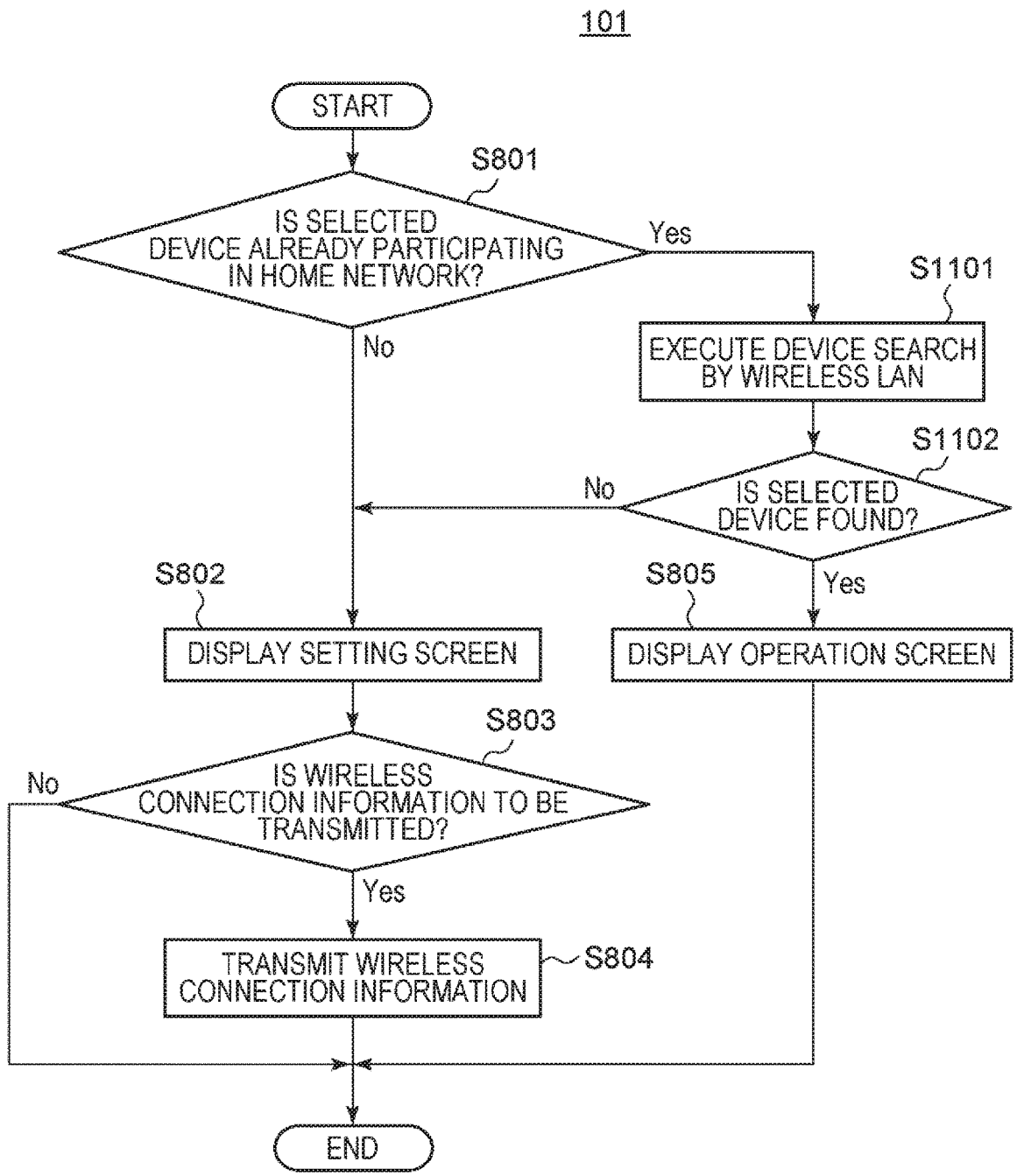

COMMUNICATION APPARATUS AND CONTROL METHOD FOR THE SAME

TECHNICAL FIELD

The present invention relates to a communication apparatus that displays a list screen of surrounding devices and a control method for the communication apparatus.

BACKGROUND ART

A technology for constructing a network in which various devices such as a smart phone, a television set, a refrigerator, a light, and a sensor are connected to the internet and the respective devices can communicate with each other attracts attention. The technology for connecting the above-described devices to the internet is referred to as Internet of Things (IoT). A user can operate and control various devices existing in a house by using a single smart phone on the basis of IoT, for example.

In a case where a plurality of devices are connected to a particular network to be used as in IoT, a new device may participate in the particular network in some cases. For example, in a case where the user purchases a new device, this new device needs to participate in an already structured network. PTL 1 describes a configuration in which a first device transmits connection data for establishing a connection to an access point to a second device as a method for the new device to particulate in the already structured network. While the second device establishes the connection to the access point on the basis of the received connection data, the second device participates in the already structured network.

CITATION LIST

Patent Literature

PTL 1: Japanese Patent Laid-Open No. 2013-153533

SUMMARY OF INVENTION

Technical Problem

When the technology described in PTL 1 is used, the new device can participate in the already structured network. However, in the case of PTL 1, a situation is not taken into account where devices participating in the already structured network and devices that are not participating in the already structured network are distinguished from one another among the plurality of devices. For example, in a case where the user purchases a new device, the user who has actually purchased the new device can easily identify the new device among the plurality of devices, but the other users do not easily distinguish which device is the new device.

The present invention provides a system with which devices participating in a particular network and devices that are not participating in the particular network can be easily distinguished from each other.

Solution to Problem

To address the above-described issue, the present invention provides a communication apparatus including: a reception unit configured to receive a packet transmitted by a device; and a display unit configured to display a list screen of a plurality of devices existing in surroundings of the communication apparatus on the basis of the packet received by the reception unit, in which the display unit displays the list screen in a manner that a user can grasp whether or not the device is already participating in a particular network.

Further features of the present invention will become apparent from the following description of exemplary embodiments with reference to the attached drawings.

BRIEF DESCRIPTION OF DRAWINGS

FIG. 1 illustrates a general representation of a communication system.

FIG. 2 illustrates a hardware configuration of a mobile terminal.

FIG. 3 illustrates a hardware configuration of a printer.

FIG. 4A illustrates a screen related to search processing.

FIG. 4B illustrates the screen related to the search processing.

FIG. 5A illustrates a setting screen and an operation screen.

FIG. 5B illustrates the setting screen and the operation screen.

FIG. 5C illustrates the setting screen and the operation screen.

FIG. 5D illustrates the setting screen and the operation screen.

FIG. 6 is a flow chart for illustrating the search processing.

FIG. 7 illustrates a search result table.

FIG. 8 is a flow chart for illustrating processing for displaying the setting screen and the operation screen.

FIG. 9 is a flow chart for illustrating processing for transmitting an advertising packet.

FIG. 10 is a flow chart for illustrating processing for attempting to participate in a home network.

FIG. 11 is a flow chart for illustrating the processing for displaying the setting screen and the operation screen.

DESCRIPTION OF EMBODIMENTS

Hereinafter, embodiments for carrying out the present invention will be described with reference to the drawings. It should be noted that the following embodiments are not intended limit the present invention as described in the section of claims, and also, all of combinations of features described in the embodiments are not necessarily essential to solving means of the present invention.

First Embodiment

First, a general representation of a communication system will be described with reference to FIG. 1. According to the present embodiment, a plurality of devices form one network. In FIG. 1, a mobile terminal 101, a television set 103, a light 104, and a refrigerator 105 form a wireless LAN network via an access point 102. According to the present embodiment, the network formed by the mobile terminal 101, the television set 103, the light 104, and the refrigerator 105 is referred to as a home network 100.

The devices participating in the home network 100 can communicate information with each other. For example, the television set 103 or the refrigerator 105 transmits its own running status (for example, an operating time while the power supply is turned ON) to the mobile terminal 101, and a user can check power consumption of the television set 103 or the refrigerator 105 by using the mobile terminal 101. Although it will be described below in detail, the user can operate and control the devices participating in the home network 100 by using the mobile terminal 101 according to the present embodiment.

A printer 106 of FIG. 1 is a device that is not participating in the home network 100. Although it will be described below in detail, the user transmits wireless connection information from the mobile terminal 101 to the printer 106 so that the printer 106 can participate in the home network 100.

Next, a hardware configuration of the mobile terminal 101 will be described with reference to FIG. 2. While it is assumed that the mobile terminal 101 according to the present embodiment is a smart phone or a tablet personal computer (PC), the smart phone or the tablet PC is an example of a communication apparatus, and other devices may be used as the mobile terminal 101.

A CPU 201 reads out a control program stored in a flash memory 203 and executes various processings for controlling an operation of the mobile terminal 101. A RAM 202 is used as a temporary storage area such as a main memory of the CPU 201 or a work area. The flash memory 203 is a non-volatile storage medium that stores the control program of the mobile terminal 101 and various pieces of data such as a photograph and an electronic document.

It should be noted that the single CPU 201 executes respective processings illustrated in a flow chart which will be described below in the case of the mobile terminal 101, but other modes may also be adopted. For example, a plurality of CPUs are operated in cooperation with one another, and respective processings illustrated in the flow chart which will be described below can also be executed. In addition, part of the processings illustrated in the flow chart which will be described below may be executed by using a hardware such as an application specific integrated circuit (ASIC).

An operation panel 204 is provided with a touch panel function with which a touch operation by the user can be detected and displays various screens. The user inputs the touch operation to the operation panel 204, so that it is possible to input a desired operation instruction to the mobile terminal 101. It should be noted that the mobile terminal 101 is provided with a hardware key which is not illustrated in the drawing, and the user can also input an operation instruction to the mobile terminal 101 by using this hardware key.

A speaker 205 and a microphone 206 are used when the user makes a call to another mobile terminal or fixed-line phone. A camera 207 picks up an image in accordance with an image pick instruction by the user. A photograph picked up by the camera 207 is stored in a predetermined area of the flash memory 203.

A Bluetooth interface (I/F) 208 executes a wireless communication based on Bluetooth (registered trademark). A wireless LAN I/F 209 is connected to an external access point (for example, the access point 102) to execute a wireless LAN communication. The wireless LAN communication executed by the wireless LAN I/F 209 is a wireless communication such as IEEE802.11a/b/g/n/ac.

Next, a hardware configuration of the printer 106 will be described with reference to FIG. 3. It should be noted that the printer 106 is an example of a communication apparatus compatible to the wireless LAN communication or Bluetooth.

A CPU 301 reads out a control program stored in a ROM 302 and executes various processings for controlling an operation of the printer 106. The ROM 302 stores the control program. A RAM 303 is used as a temporary storage area such as a main memory of the CPU 301 or a work area. A HDD 304 is a non-volatile storage medium that stores various pieces of data.

It should be noted that, in the case of the printer 106, the single CPU 301 executes the respective processings illustrated in the flow chart which will be described below, but the other modes may also be adopted. For example, a configuration in which a plurality of CPUs are operated in cooperation with one another to execute the respective processings illustrated in the flow chart which will be described below can also be adopted. In addition, part of the processings illustrated in the flow chart which will be described below may be executed by using hardware such as an ASIC.

A network I/F 305 is connected to a network via a LAN cable. The network I/F 305 can communicate with an external apparatus (for example, a PC) on the network.

A printing unit 306 executes printing processing on a sheet on the basis of printing data received by a wireless LAN I/F 310 or the network I/F 305. A reading unit 307 reads an original placed by the user and generates an original image. The original image generated by the reading unit 307 is printed by the printing unit 306 (so-called copying processing) or accumulated in the HDD 304.

An operation unit 308 is provided with a liquid crystal display unit having a touch panel function or a keyboard and displays various operation screens. The user can input an instruction or information to the printer 106 via the operation unit 308.

A Bluetooth I/F 309 executes a wireless communication based on Bluetooth. The wireless LAN I/F 310 is connected to the external access point (for example, the access point 102) and executes the wireless LAN communication. The wireless LAN communication executed by the wireless LAN I/F 310 is a wireless communication such as IEEE802.11a/b/g/n/ac.

According to the present embodiment, the user can operate and control the devices that are participating in (connected to) the home network 100 by using the mobile terminal 101. In addition, the user can cause devices that are not participating in the home network 100 to be participating in (connected to) the home network 100 by using the mobile terminal 101. According to the present embodiment, these processings are referred to as a home network service. The home network service will be described in detail with reference to FIGS. 4A and 4B and FIGS. 5A to 5D.

First, the user searches for surrounding devices by using the mobile terminal 101. A search screen 400 of FIG. 4A is a screen displayed by the operation panel 204 of the mobile terminal 101 in accordance with the operation of the user and is used to search for a surrounding device. When the user touches a start button 401, search processing for the mobile terminal 101 to search for the surrounding device is started.

The search processing will be described in detail. According to the present embodiment, the respective devices such as the printer 106, the television set 103, the light 104, and the refrigerator 105 periodically transmit advertising packets of Bluetooth Low Energy (hereinafter, will be referred to as BLE) to the surroundings. The mobile terminal 101 searches for a surrounding device by receiving this advertising packet.

The advertising packet includes the following data.
(Device Name)
This device name is information indicating a device name. For example, the information includes a model name or a name set by the user.

(Device Category)

This device category is information indicating a category (type) of the device. For example, the information includes a printer, a television set, a light, a refrigerator, a mobile device, a PC, a sensor, and the like.

(MAC Address)

This MAC address is information indicating a MAC address of the device.

(Service ID)

This service ID is a particular ID indicating the home network service. An operation and control of the device that transmits the advertising packet including this particular ID can be performed on the basis of the home network service from the mobile terminal 101.

(Home Network Participating Status)

This participating status is status information indicating whether or not the device is participating in the home network. For example, "1" is set as the status information in a case where the device is already participating in the home network, and "0" is set as the status information in a case where the device is not participating in the home network.

When the search for the surrounding devices is completed, the mobile terminal 101 displays a search result screen 410 of FIG. 4B on the operation panel 204. The search result screen 410 is a list screen of devices existing in the surroundings of the mobile terminal 101. The device category, the device name, and the home network participating status are displayed on the search result screen 410 on the basis of the information included in the received advertising packet. An icon 411, an icon 412, an icon 413, and an icon 414 are icons indicating the device category. When the device category is a "printer", an icon indicating a printer is displayed, and when the device category is a "refrigerator", an icon indicating a refrigerator is displayed. A device name 415, a device name 416, a device name 417, and a device name 418 indicate names of the respective devices. The device names are, for example, model names. The user can check the category of the surrounding device and the device name by using the search result screen 410.

Identification information 419, identification information 420, identification information 421, and identification information 422 are identification information indicating the home network participating status and are associated with each of the surrounding devices. According to the present embodiment, since the printer 106 is not participating in the home network 100, the identification information 419 indicates "not participating". On the other hand, since the television set 103, the light 104, and the refrigerator 105 are already participating in the home network 100, the identification information 420, 421, and 422 indicate "already participating". The user can easily grasp which device is already participating in the home network and which device is not participating in the home network on the basis of the identification information indicating the home network participating status.

The user can select a desired device from among a plurality of devices displayed on the search result screen 410 and operate and control the selected device. According to the present embodiment, a screen presented to the user is switched depending on whether or not the device selected by the user is participating in the home network. Specifically, in a case where the device that is not participating in the home network is selected by the user, a setting screen for causing this device to participate in the home network is presented to the user. On the other hand, in a case where the device that is already participating in the home network is selected by the user, an operation screen for operating this device is presented to the user.

A setting screen 500 of FIG. 5A is a screen displayed on the operation panel 204 by the mobile terminal 101 when the device that is not participating in the home network (for example, the printer 106) is selected by the user on the search result screen 410. According to the present embodiment, when the printer 106 is connected to the access point 102, the printer 106 can participate in the home network 100. The user inputs an SSID of the access point 102, a security type, and a KEY (for example, a WEP key) to an input field 501, an input field 502, and an input field 503 on the setting screen 500. When the user touches a transmission button 504, the wireless connection information input to the input field 501, the input field 502, and the input field 503 are transmitted from the mobile terminal 101 to the printer 106 by using Bluetooth. This communication is realized by using Generic Attribute Profile (GATT) of BLE. While the printer 106 that has received the wireless connection information is connected to the access point 102 on the basis of the wireless connection information, the printer 106 participates in the home network 100.

It should be noted that the setting screen 500 may be presented to the user in a state in which the SSID of the access point to which the mobile terminal 101 is currently connected, the security type, and the KEY are input in advance to the input field 501, the input field 502, and the input field 503. Accordingly, in a case where the access point to which the mobile terminal 101 is currently connected and an access point used for the participation to the home network are matched with each other, work for the user to input the wireless connection information is eliminated, and usability is improved.

An operation screen 510 of FIG. 5B, an operation screen 520 of FIG. 5C, and an operation screen 530 of and FIG. 5D are screens displayed by the mobile terminal 101 on the operation panel 204 when the device that is already participating in the home network is selected by the user on the search result screen 410. In a case where the device that is already participating in the home network is selected by the user on the search result screen 410, the operation screen corresponding to the device category of the device selected by the user is displayed. When the user selects the light 104 on the search result screen 410, the mobile terminal 101 displays the operation screen 510 of FIG. 5B. When the user selects the refrigerator 105 on the search result screen 410, the mobile terminal 101 displays the operation screen 520 of FIG. 5C. When the user selects the television set 103 on the search result screen 410, the mobile terminal 101 displays the operation screen 530 of FIG. 5D. The contents instructed by the user on the respective operation screens are transmitted to the respective devices by using GATT of BLE.

Next, the search processing for searching for the surrounding devices described with reference to FIGS. 4A and 4B will be described with reference to a flow chart of FIG. 6. Respective steps illustrated in the flow chart of FIG. 6 are processed while the CPU 201 of the mobile terminal 101 expands the control program stored in the memory such as the flash memory 203 to the RAM 202 to be executed.

When the start button 401 of the search screen 400 is pressed by the user, the processing illustrated in the flow chart of FIG. 6 is executed. First, in step S401, the CPU 201 determines whether or not the advertising packet is received. In a case where the advertising packet is received by the Bluetooth I/F 208, the processing proceeds to step S602. On the other hand, in a case where the advertising packet is not received by the Bluetooth I/F 208, the processing proceeds to step S605.

Next, step S602 will be described. In step S602, the CPU 201 determines whether or not the received advertising packet includes a predetermined service ID. In a case where the service ID included in the received advertising packet is matched with a particular ID indicating the home network service, it is determined as Yes in step S602, and the processing proceeds to step S603. On the other hand, in a case where the service ID included in the received advertising packet is not matched with the particular ID indicating the home network service, it is determined as No in step S602, and the processing proceeds to step S605. In addition, in a case where the service ID is not included in the received advertising packet, it is determined as No in step S602, and the processing proceeds to step S605.

Next, step S603 will be described. In step S603, the CPU 201 determines whether or not a transmission source device of the received advertising packet is an already searched device. According to the present embodiment, in a case where the MAC address included in the received advertising packet is stored in a search result table 700 which will be described later, it is determined as Yes in step S603, and the processing proceeds to step S605. On the other hand, in a case where the MAC address included in the received advertising packet is not stored in the search result table 700 which will be described later, it is determined as No in step S603, and the processing proceeds to step S604.

Next, step S604 will be described. In step S604, the CPU 201 stores the information included in the received advertising packet in the search result table 700 of FIG. 7. The search result table 700 is a table for managing the result of the search processing and is stored in the flash memory 203. In step S604, the device name, the device category, the MAC address, and the home network participating status included in the received advertising packet are stored in the search result table 700. The search result screen 410 of FIG. 4B is displayed on the basis of the information stored in the search result table 700.

Next, step S605 will be described. In step S605, the CPU 201 determines whether or not the search processing is ended. In a case where a predetermined time elapses since the search processing is started (for example, 15 seconds) or a case where an instruction for ending the search processing is input to the user, the CPU 201 determines that the search processing is ended, and the processing proceeds to step S606. On the other hand, in a case where predetermined time does not elapse since the search processing is started, the CPU 201 determines that the search processing is not ended, and the processing returns to step S601.

Next, step S606 will be described. In step S606, the CPU 201 displays the result of the search processing on the operation panel 204. The result of the search processing is displayed on the basis of the information stored in the search result table 700. The search result screen 410 of FIG. 4B is an example of a screen displayed in step S606. The user can check the category of the surrounding device and the device name by using the search result screen 410. In addition, the user can easily grasp which device is already participating in the home network and which device is not participating in the home network by using the search result screen 410.

It should be noted that there may be a case where the information is not stored in the search result table 700, and this case indicates that a device compatible to the home network service does not exist in the surroundings. In a case where the information is not stored in the search result table 700, in step S606, a message indicating that the device compatible to the home network service does not exist in the surroundings is displayed.

Next, processing executed when the user selects a desired device from the search result of the search processing will be described by using a flow chart of FIG. 8. Respective steps illustrated in the flow chart of FIG. 8 are processed while the CPU 201 of the mobile terminal 101 expands the control program stored in the memory such as the flash memory 203 onto the RAM 202 to be executed.

When the user selects a device from the search result (for example, the search result screen 410), in step S801, the CPU 201 determines whether or not the device selected by the user is already participating in the home network. This determination is realized by referring to the information stored in the search result table 700. In a case where the selected device is already participating in the home network, the processing proceeds to step S805. On the other hand, in a case where the selected device is not participating in the home network, the processing proceeds to step S802.

Next, step S805 will be described. In step S805, the CPU 201 displays the operation screen corresponding to the device category of the selected device on the operation panel 204. The operation screen 510 of FIG. 5B, the operation screen 520 of FIG. 5C, and the operation screen 530 of FIG. 5D are examples of the operation screen displayed in step S805. With the processing in step S805, the user can operate and control the respective devices participating in the home network 100. In addition, since the operation screen corresponding to the device category is presented to the user, the usability for the user is improved.

Next, step S802 will be described. In step S802, the CPU 201 displays a setting screen for causing the selected device to participate in the home network on the operation panel 204. The setting screen 500 of FIG. 5A is an example of the setting screen displayed in step S802. The user inputs the wireless connection information used for the selected device to participate in the home network on the setting screen displayed in step S802.

Next, in step S803, the CPU 201 determines whether or not the wireless connection information is transmitted to the selected device. When the transmission button 504 of the setting screen 500 is touched by the user, the CPU 201 determines that the wireless connection information is transmitted to the selected device, and the processing proceeds to step S804. On the other hand, in a case where the user inputs a cancel instruction, the CPU 201 determines that the wireless connection information is not transmitted to the selected device, and the processing illustrated in the flow chart of FIG. 8 is ended.

Next, step S804 will be described. In step S804, the CPU 201 transmits the wireless connection information (according to the present embodiment, the SSID, the security type, or the KEY) to the selected device. Specifically, the Bluetooth I/F 208 is controlled so as to transmit the wireless connection information, and the Bluetooth I/F 208 transmits the wireless connection information to the selected device by using GATT of BLE. Although detailed descriptions will be given below with reference to FIG. 10, the device that has received the wireless connection information attempts to participate in the home network. According to the present embodiment, in a case where the device selected by the user is the device that is not participating in the home network, the setting screen for causing this device to participate in the home network is presented to the user, so that the usability for the user is improved.

Next, processing executed by the device compatible to the home network service will be described according to the present embodiment. While the device name, the device category, its own MAC address, the service ID, and the home network participating status are included in the advertising packet of BLE, the device compatible to the home network service periodically transmits this advertising packet. This processing will be described with reference to a flow chart of FIG. 9. Respective steps illustrated in the flow chart of FIG. 9 are processed while the CPU 301 of the printer 106 expands the control program stored in the memory such as the ROM 302 to the RAM 303 to be executed. It should be noted that the printer 106 is an example of the device compatible to the home network service, and the other devices compatible to the home network service such as the television set 103, the light 104, and the refrigerator 105 can also execute the processing of the flow chart of FIG. 9.

The processing illustrated in the flow chart of FIG. 9 is executed at a timing when the advertising packet is periodically transmitted. First, in step S901, the CPU 301 determines whether or not the printer 106 is already participating in the home network. When the printer 106 is already participating in the home network, the processing proceeds to step S902. Subsequently, in step S902, the CPU 301 transmits the advertising packet indicating that the printer 106 is already participating in the home network. Specifically, the CPU 301 generates the advertising packet in which the status information is set as "1" and transmits this advertising packet to the Bluetooth I/F 309.

On the other hand, when it is determined in step S901 that the printer 106 is not already participating in the home network, the processing proceeds to step S903. Subsequently, in step S903, the CPU 301 transmits the advertising packet indicating that the printer 106 is not participating in the home network. Specifically, the CPU 301 generates the advertising packet in which the status information is set as "0" and transmits this advertising packet to the Bluetooth I/F 309.

As described above, the device compatible to the home network service like the printer 106 can switch the type of the advertising packet to be transmitted in accordance with whether or not the device itself is already participating in the home network.

In addition, as described in the setting screen 500 of FIG. 5A or step S804 of FIG. 8, the device that is not participating in the home network attempts to participate in the home network by using the wireless connection information received from the mobile terminal 101. This processing will be described by using a flow chart of FIG. 10. Respective steps illustrated in the flow chart of FIG. 10 are processed while the CPU 301 of the printer 106 expands the control program stored in the memory such as the ROM 302 to the RAM 303 to be executed. It should be noted that the printer 106 is an example of the device compatible to the home network service, and the other devices compatible to the home network service such as the television set 103, the light 104, and the refrigerator 105 can also execute the processing illustrated in the flow chart of FIG. 10.

First, in step S1001, the CPU 301 receives the wireless connection information transmitted from the external apparatus such as the mobile terminal 101. Specifically, the Bluetooth I/F 309 receives the wireless connection information by using GATT OF BLE. Next, in step S1002, the CPU 301 attempts to participate in the home network on the basis of the received wireless connection information. Specifically, the CPU 301 controls the wireless LAN I/F 310 such that a connection to the access point is established by using the wireless connection information.

Next, in step S1003, the CPU 301 determines whether or not the participation in the home network is succeeded. In a case where the connection to the access point is succeeded, it is determined in step S1003 that the participation in the home network is succeeded, and the processing proceeds to step S1004. Subsequently, in step S1004, the CPU 301 changes the advertising packet to be transmitted to the advertising packet indicating that the CPU 301 is already participating in the home network. Specifically, the CPU 301 changes the status information included in the advertising packet from "0" to "1". The printer 106 changes the advertising packet to be transmitted on condition that the participation in the home network 100 is succeeded.

On the other hand, in a case where the connection to the access point is failed, it is determined in step S1003 that the participation in the home network is failed, and the processing illustrated in the flow chart of FIG. 10 is ended. At this time, the mobile terminal 101 may be notified of a message indicating that the participation in the home network is failed by using Bluetooth.

According to the present embodiment, the device compatible to the home network service can switch the type of the advertising packet to be transmitted in accordance with whether or not the device itself is already participating in the home network. With this configuration, the user who has searched for the device can easily grasp which device is already participating in the home network and which device is not participating in the home network.

Second Embodiment

Next, a modified example of the first embodiment will be described with reference to a flow chart of FIG. 11. The flow chart of FIG. 11 illustrates processing executed when the user selects a desired device from the search result of the search processing, and steps where the processing similar to FIG. 8 is performed is assigned with the same numeral as that of FIG. 8. Respective steps illustrated in the flow chart of FIG. 11 are processed while the CPU 201 of the mobile terminal 101 expands the control program stored in the memory such as the flash memory 203 to the RAM 202 to be executed.

When it is determined in step S801 that the device selected by the user is already participating in the home network, the processing proceeds to step S1101. Subsequently, in step S1101, the CPU 201 executes the device search based on the wireless LAN. Specifically, the CPU 201 controls the wireless LAN I/F 310 such that a search packet for obtaining the MAC address is transmitted.

Next, in step S1102, the CPU 201 determines whether or not the selected device is found in the device search based on the wireless LAN. Specifically, the CPU 201 determines whether or not the MAC address of the selected device exists in a MAC address included in the response packet with respect to the search packet transmitted in step S1101.

In a case where the MAC address of the selected device exists in the MAC address included in the response packet, the home network in which the mobile terminal 101 is participating is matched with the home network in which the selected device is participating. In the above-described case, the CPU 201 determines in step S1102 that the selected device is found, and the processing proceeds to step S805. Subsequently, in step S805, the CPU 201 displays the operation screen corresponding to the device category of the selected device.

On the other hand, in a case where the MAC address of the selected device does not exist in the MAC address included in the response packet, the home network in which the mobile terminal 101 is participating is not matched with the home network in which the selected device is participating. In the above-described case, the CPU 201 determines in step S1102 that the selected device is not found, and the processing proceeds to step S802. Subsequently, in step S802, the CPU 201 displays the setting screen for causing the selected device to participate in the home network instead of the operation screen corresponding to the device category of the selected device.

According to the present embodiment, in a case where the home network in which the mobile terminal 101 is participating is not matched with the home network in which the selected device is participating, the selected device can participate in the home network in which the mobile terminal 101 is participating.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-201388, filed Oct. 9, 2015, which is hereby incorporated by reference herein in its entirety.

The invention claimed is:

1. A communication apparatus comprising:
a communication interface;
a display device;
a memory device that stores a set of instructions; and
at least one processor that executes the instructions to:
receive a packet transmitted by a device via the communication interface;
display, upon receiving the packet, a selection screen that includes a display object corresponding to the device that transmits the packet, on the display device, wherein the packet includes, at least, information that indicates whether or not the device that transmits the packet already participates in a network that has been provided by an external wireless access point, wherein a communication method used for communication performed between the external wireless access point and the device via the network is different from a communication method to be used for communicating the packet; and
determine whether the information included in the packet indicates that the device that transmits the packet already participates in the network that has been provided by the external wireless access point or that the device that transmits the packet does not participate in the network that has been provided by the external wireless access point,
wherein, in a case where a plurality of packets transmitted by respective devices, including the packet transmitted by the device, are received, a plurality of display objects corresponding to the respective devices, including the display object corresponding to the device that transmits the packet, are displayed on the selection screen, and
wherein the display object is displayed in a manner such that the display object includes at least a first information item indicating that the device already participates in the network that has been provided by the external wireless access point and a second information item indicating a name of the device if it is determined that the information included in the packet indicates that the device that transmits the packet already participates in the network that has been provided by the external wireless access point, and in a manner such that the display object includes at least a third information item indicating that the device does not participate in the network and a fourth information item indicating a name of the device if it is determined that the information included in the packet indicates that the device that transmits the packet does not participate in the network.

2. The communication apparatus according to claim 1, wherein the at least one processor further executes the instructions to:
determine, upon condition that one of the plurality of display objects is selected by a user via the screen, whether or not the device corresponding to the selected display object is a device that already participates in the network, and
display a setup screen for setting up the device corresponding to the selected display object on the display device if it is determined that the device corresponding to the selected display object is not a device that already participates in the network.

3. The communication apparatus according to claim 2, wherein the at least one processor further executes the instructions to:
display an operation screen for remote control of the device corresponding to the selected display object on the display device if it is determined that the device corresponding to the selected display object is a device that already participates in the network.

4. The communication apparatus according to claim 3,
   wherein the packet further includes information indicating a category of the device that transmits the packet, and
   wherein the display object is displayed with icon information corresponding to the category of the device.

5. The communication apparatus according to claim 2, wherein the setup screen is a screen for setting a connection information for connecting with an access point conforming to an IEEE 802.11 series to be set on the device corresponding to the selected display object.

6. The communication apparatus according to claim 5, wherein the setup screen is presented to the user in a state in which network information related to an access point to which the communication apparatus is currently connected is set in advance.

7. The communication apparatus according to claim 5,
   wherein the at least one processor further executes the instructions to transmit the connection information input on the setup screen to the selected device.

8. The communication apparatus according to claim 1, wherein the packet is an advertising packet of Bluetooth Low Energy and the network of the communication method different from the communication method to be used for transmitting and receiving the packet is a wireless network conforming to IEEE802.11 series.

9. The communication apparatus according to claim 1, wherein the at least one processor further executes the instructions to:
   accept a user operation to start a device search, wherein the selection screen that includes the display object is displayed after the user operation to start the device search.

10. The communication apparatus according to claim 9, wherein the at least one processor further executes the instructions to:
    display a predetermined message on the display device upon condition that no device is found within a predetermined time after accepting the user operation to start the device search.

11. A control method for a communication apparatus having a communication interface, the control method comprising:
    receiving a packet transmitted by a device via the communication interface;
    displaying, upon receiving the packet, a selection screen that includes a display object corresponding to the device that transmits the packet, on a display device,
    wherein the packet includes, at least, information that indicates whether or not the device that transmits the packet already participates in a network that has been provided by an external wireless access point, wherein a communication method used for communication performed between the external wireless access point and the device via the network is different from a communication method to be used for communicating the packet; and
    determining whether the information included in the packet indicates that the device that transmits the packet already participates in the network that has been provided by the external wireless access point or that the device that transmits the packet does not participate in the network that has been provided by the external wireless access point,
    wherein, in a case where a plurality of packets transmitted by respective devices, including the packet transmitted by the device, are received, a plurality of display objects corresponding to the respective devices, including the display object corresponding to the device that transmits the packet, are displayed on the selection screen, and
    wherein the display object is displayed in a manner such that the display object includes at least a first information item indicating that the device already participates in the network that has been provided by the external wireless access point and a second information item indicating a name of the device if it is determined that the information included in the packet indicates that the device that transmits the packet already participates in the network that has been provided by the external wireless access point, and in a manner such that the display object includes at least a third information item indicating that the device does not participate in the network and a fourth information item indicating a name of the device if it is determined that the information included in the packet indicates that the device that transmits the packet does not participate in the network.

12. A communication system at least including a first communication apparatus having at least one first processor and a second communication apparatus having at least one second processor,
    wherein the at least one first processor of the first communication apparatus executes a first set of instructions to:
    determine whether or not the first communication apparatus already participates in a network that has been established by an external wireless access point; and
    externally transmit, based on a result of the determination, a Bluetooth packet that includes, at least, information that indicates whether or not the first communication apparatus already participates in the network, wherein the Bluetooth packet includes information indicating that the first communication apparatus already participates in the network if it is determined that the first communication apparatus already participates in the network and includes information indicating that the first communication apparatus does not participate in the network if it is determined that the first communication apparatus does not participate in the network,
    wherein the at least one second processor of the second communication apparatus that executes a second set of instructions to:
    receive a packet transmitted by the first communication apparatus via a second communication interface;
    determine whether information included in the packet indicates that the first communication apparatus that transmits the packet already participates in the network or that the first communication apparatus that transmits the packet does not participate in the network; and
    display, upon receiving the packet, a selection screen that includes a display object corresponding to the first communication apparatus that transmits the packet, on the display device,
    wherein, in a case where a plurality of packets transmitted by respective communication apparatuses, including the packet transmitted by the first communication apparatus, are received, a plurality of display objects corresponding to the respective communication apparatuses, including the display object corresponding to the communication apparatus that transmits the packet, are displayed on the selection screen, and wherein the display object is displayed in a manner such that the display object includes at least a first information item indicating that the first communication apparatus already participates in the network and a second information item indicating a name of the first communication apparatus if it is determined that the information included in the packet indicates that the first communication apparatus that transmits the packet already participates in the network, and in a manner such that the display object includes at least a third information item indicating that the first communication apparatus does not participate in the network and a fourth information item indicating a name of the first communication apparatus if it is determined that the information included in the packet indicates that the first communication apparatus that transmits the packet does not participate in the network.

* * * * *